United States Patent [19]

Pickard

[11] Patent Number: 5,551,715

[45] Date of Patent: Sep. 3, 1996

[54] TWO POSITION UTILITY BASKET

[76] Inventor: Albert Pickard, 14308 Big Ridge Rd., Biloxi, Miss. 39532

[21] Appl. No.: 347,648

[22] Filed: Nov. 30, 1994

[51] Int. Cl.⁶ ........................................................ B62B 5/04
[52] U.S. Cl. .......................... 280/43.24; 188/5; 280/79.2
[58] Field of Search .......................... 188/5, 8; 280/7.12, 280/8, 9, 30, 43, 43.14, 43.24, 79.11, 79.2

[56] References Cited

U.S. PATENT DOCUMENTS

| | | | |
|---|---|---|---|
| 896,050 | 8/1908 | Zwemer | 280/43.14 |
| 1,092,220 | 4/1914 | Koch et al. | 280/43.14 |
| 2,484,951 | 10/1949 | Kubo | 280/43.24 |
| 2,814,498 | 11/1957 | Hull | 280/43.24 |
| 2,964,327 | 12/1960 | Mohr | 280/43.24 |
| 3,350,095 | 10/1967 | Clasen | 280/43.24 |
| 4,003,583 | 1/1977 | Stanzel | 280/43.24 X |
| 4,313,612 | 2/1982 | Rubens | 20/43.24 |
| 4,878,680 | 11/1989 | Molnar | 280/43.14 X |
| 5,433,578 | 7/1995 | Honan | 280/43.24 X |

FOREIGN PATENT DOCUMENTS

| | | |
|---|---|---|
| 1132757 | 3/1957 | France . |
| 1039-779-A | 7/1983 | U.S.S.R. . |
| 1232144 | 5/1971 | United Kingdom . |

*Primary Examiner*—Eric D. Culbreth
*Assistant Examiner*—Michael Mar
*Attorney, Agent, or Firm*—Pravel, Hewitt, Kimball & Krieger

[57] ABSTRACT

A load-bearing platform with fixedly attached wheels. A surrounding basket member is suspended from the platform, so that the basket member can be raised to a position exposing the wheels, at which point latches lock the outer portion of the basket in an upward position for ready rolling. The unloaded platform can be braked against movement by lowering the outer basket against the ground by pushing down on the walls of the basket, unlatching the wheels and pushing the platform up with respect to the basket. This particular construction has the wheels directly attached to the load-bearing platform; the basket is locked or moved by pushing or lifting on the side portions of the basket between an upper and a lowered position.

10 Claims, 2 Drawing Sheets

TWO POSITION UTILITY BASKET

BACKGROUND OF THE INVENTION

This invention relates to baskets for moving parts or miscellaneous items.

Various designs are known for parts baskets which provide for a braking function to prevent the basket form moving unless motion is desired, but which allow the load to be easily moved from place to place. These devices generally involve a combination of wheels for movement and some sort of braking system.

BRITISH PATENT 1,232,144 to Rama discloses a platform support for heavy appliances having fixed wheels and having four corner footpads with wedged tops. A cam actuator driven by a foot pedal in the center of the device drives bars against the upper wedges, forcing the footpads down lifting the frame off the wheels to secure the device against movement. Release of the foot lever retracts the footpads so that the unit can roll on the provided wheels. The load-bearing platform is directly attached to the wheels.

U.S. Pat. No. 2,484,951 to Kubo discloses a support for luggage in which a set of wheels, mounted internally in the luggage, is pivoted around an axis from a retracted to an extended position. A lever extending out from the wheels engages a two-position latch so that it may be moved by foot pressure from a retracted latch position to an extended latch position. A spring is provided to bias the wheels into the extended latched position if the luggage is raised.

SOVIET UNION PATENT 1039779 to Dorozhenko shows a load-bearing trolley with a working platform. In this platform, the platform is suspended from the wheeled base by load-bearing springs which hold up posts. If a load on the platform exceeds the load-bearing capacity of the springs, the posts descend to the ground, locking and breaking the trolley from movement. Helical spring adjustment devices are provided for raising or lowering the pre-set compression of the spring and, thus, changing the load-bearing capacity of the platform. Thus, the platform can be set for varying weights; any load above the weight lowers the posts to rest on the ground stopping the trolley from rolling. Any weight less than the pre-set weight on the platform permits the unit to move freely.

U.S. Pat. No. 4,313,612 to Rubens discloses a support for a trash container which includes four wheels, each on independent supports which may moved and pinned to a retracted position providing a ground supported trash container or to an extended position providing a wheeled trash container.

U.S. Pat. No. 3,350,095 to Clasen discloses, as part of a walker, a wheel assembly supported by springs and attached to the foot of the walker so that when no pressure is on the walker, the spring lowers the wheel assembly, lifting the walker and supporting it on the wheel for easy movement; if weight is pressed upon the walker, the spring is compressed, the wheel assembly retracted, and the pad at the base of the walker rests directly upon the ground.

U.S. Pat. No. 2,814,498 to Hull discloses a carriage assembly in which wheels for moving the carriage are mounted pivotally on a swing arm which can be folded out of the way by pulling a pin, causing the device to lower itself onto support blocks. One version of the device supports the wheels upon a pivoting plate.

U.S. Pat. No. 2,964,327 to Mohr discloses a craft workbench in which the wheels are fixed to the load-bearing section of the platform and moveable ground-support feet are provided which may be lowered by a pivoting lever arm depressible by the foot. Depression of the foot pedal against the spring force lowers the feet, securing the bench against movement.

FRENCH PATENT 1132757 to Haase discloses a cart in which the wheels are mounted on pivoting levers which in turn are raised or lowered from an extended or a retracted position by a lever arm bearing on the platform levers.

SUMMARY OF THE INVENTION

The invention is a load-bearing platform with fixedly attached wheels. A surrounding basket member is suspended from the platform, so that the platform can be raised to a position exposing the wheels, at which point latches lock the outer portion of the basket in an upward position for ready rolling. The unloaded platform can be braked against movement by lowering the outer basket against the ground by pushing down on the walls of the basket, unlatching the wheels and pushing the platform up with respect to the basket. This particular construction has the wheels directly attached to the load-bearing platform; the basket is locked or moved by pushing or lifting on the side portions of the basket between an upper and a lowered position.

The locks in one embodiment are formed of plastic extrusions which interact to latch in either of two vertically separated positions. The latches are such that one latch may be mounted on each end of the basket, with the mating part on the wheeled platform, or the position of the two cooperating parts may be reversed. The latches may be mounted additionally periodically along the sides of the basket for larger baskets. Since only the outer basket is locked in position, the load bearing wheeled platform always riding on the ground, the basket may be relatively light in weight, and the latches therefore are designed to move with relatively little force.

It is therefore an object of the invention to disclose a wheeled container having a readily braked position and a moveable position, each of which are readily set.

It is a further object of the invention to disclose a construction for a wheeled container which can be easily braked to hold it in position.

It is a further object of the invention to disclose a structure for a wheeled container brake which has minimum parts and is easily applied and released.

It is a further object of the invention to disclose a wheeled container of particularly simple construction.

It is a further object of the invention to disclose a wheeled container which an operator can easily lock in position against movement.

It is a further object of the invention to disclose a braking system for a wheeled container which has significant resistance to partial damage.

It is a further object of the invention to disclose a basket container which is easily set in a braked or a moveable position.

These and other objects of the invention can be seen from the embodiment described below.

DETAILED DESCRIPTION OF THE INVENTION

Figure 1:
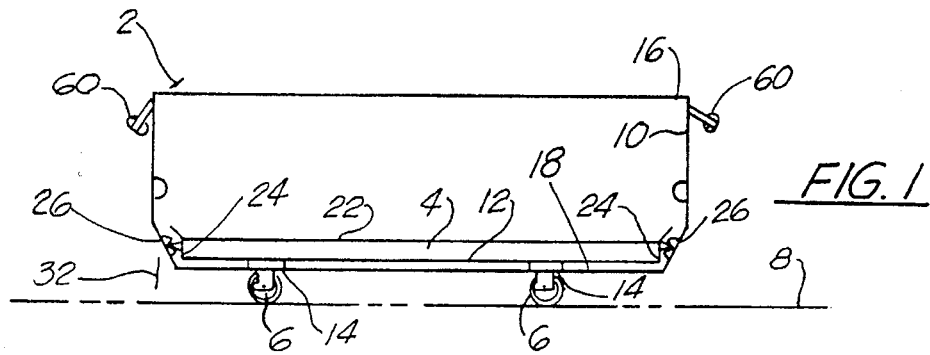
FIG. 1 is a side cut away view of an embodiment of the invention.
Figure 2:
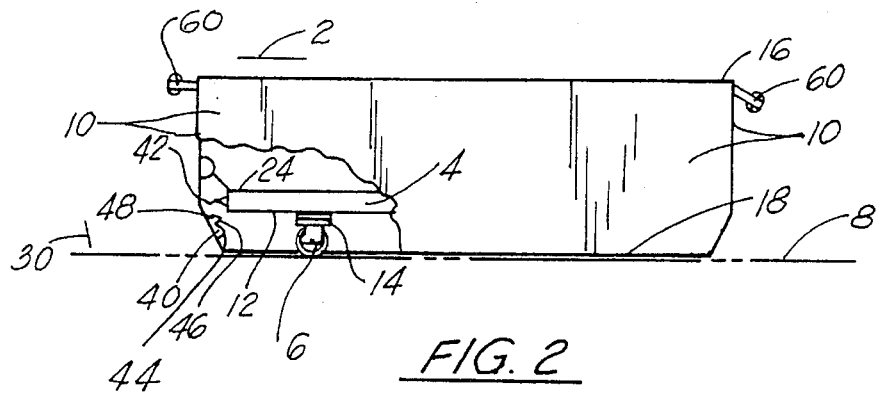
FIG. 2 is a side view of the embodiment of FIG. 1 is a braked position.

The invention is shown as a parts carrying basket 2 in the preferred embodiment. However it will be understood that baskets for carrying parts include such various versions as clothes hampers through industrial parts container. Each such basket 2 has a load carrying bottom 4, supported by wheels 6 on a ground level 8 or floor level for movement, and upward arising sides 10, usually of cloth or open mesh weave fabric or metal for retaining the basket contents on the load carrying bottom 4. A recurring problem with such baskets is providing some means for braking the basket from unintentional movement, where the basket 2 should remain in position during loading and unloading, and yet freeing the basket 2 for easy movement on its wheels form one place to another.

The invention shows an innovative construction for such a basket 2. The described embodiment illustrates one form of such basket.

The load carrying bottom is formed as a flat, rectangular platform 4. This platform 4 can be made of any load bearing material; depending on the items to be carried, it may be wooden, or a structural plastic, or may be a metal sheet or plate. The load bearing platform 4 is supported by a plurality of wheels 6, affixed in a regular pattern to the bottom 12 of the platform 4. These wheels 6 are preferably pivoting wheels, mounted in bearings 14 so that the direction of rotation may be freely changed. However, in as much as the wheels 6 are fixed to the platform 4, their construction is simple, and casters, such as are used on furniture or the like, are usually suitable.

A useful load, such as parts, is retained on said platform 4 by a basket enclosure 16. In the embodiment, this may be a plastic enclosure, having a base member 18 mounted between the platform 4 and the floor 8, having openings 20 for passing the casters 6, but otherwise enclosing the platform 4. Upward sides 10 arise from the base member 18, closely enclosing the sides 22 and ends 24 of the platform 4, rising a vertical distance sufficient to enclose the intended load of the basket 2.

Figure 3:
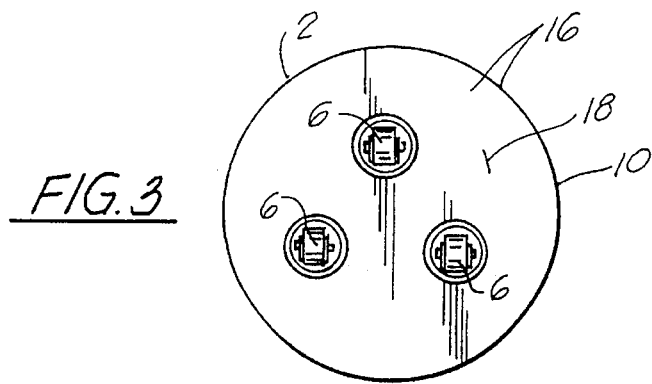
FIG. 3 is a bottom view of a circular basket embodiment of the invention.
Figure 4:
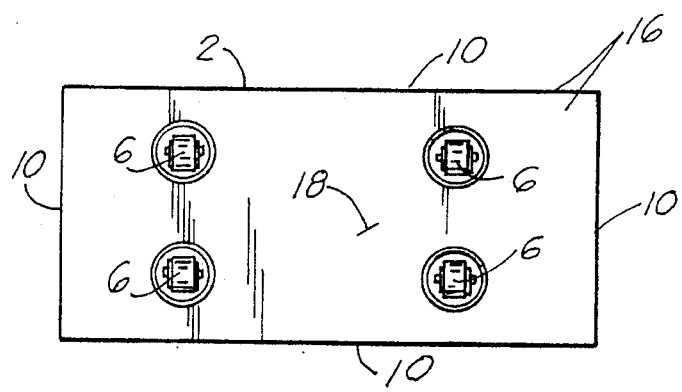
FIG. 4 is a bottom view of a rectangular basket embodiment of the invention.
Figure 5:
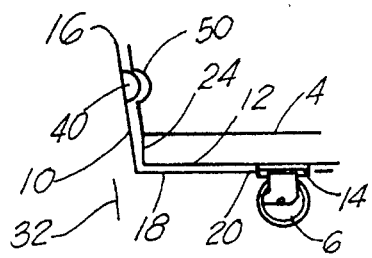
FIG. 5 is a detail of one embodiment of the latch of the invention.
Figure 7:
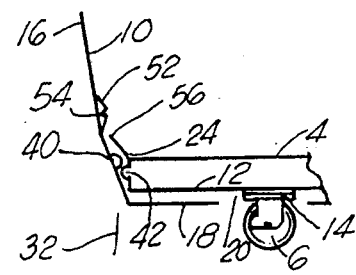
FIG. 7 is a detail of a third embodiment of the latch of the invention.
Figure 6:
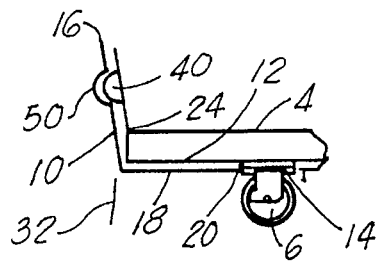
FIG. 6 is a detail of a second embodiment of the latch of the invention.
Figure 8:
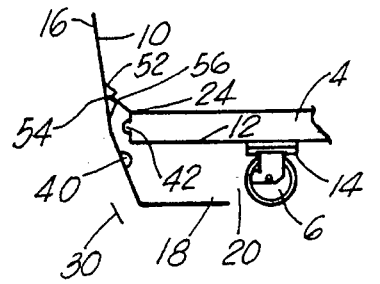
FIG. 8 is a detail of the embodiment of FIG. 7 in a braked position.
Figure 9:
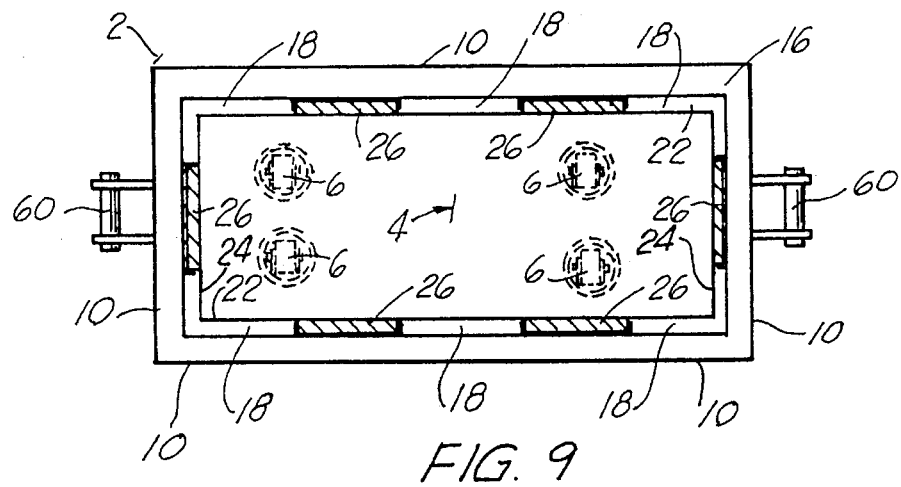
FIG. 9 is a top view of the embodiment of FIG. 4.
Figure 10:
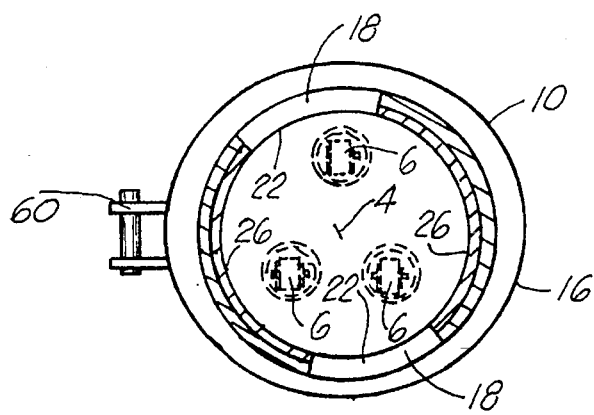
FIG. 10 is a top view of the embodiment of FIG. 3.

While the described embodiment is based on a rectangular platform 4, it should be understood that alternate platform 4 shapes are possible. For example, a clothes hamper or waste can embodiment of the invention, as shown in FIGS. 3 and 10, may have a circular load bearing platform 4, supported by three wheels 6 in a tripod configuration; the basket enclosure 16 would then be cylindrical in configuration, the entire inventive basket 2 then resembling a open wheeled garbage can in external appearance.

The basket enclosure 16 may be made of many materials so long as the shape is self-supporting. The described embodiment envisions the basket enclosure 16 being made of a molded structural plastic. It may also be formed of a composite material, a fiber reinforced plastic. Containers 2 for heavier parts or for industrial applications may be formed of wire mesh or of sheet metal. Containers 2 for light industrial applications, for example laundries or libraries, may have cloth sides 10 reinforced by metal or wire frames for stiffness.

The basket enclosure 16 is interconnected with the load platform 4 by a plurality of two way latches 26 which support the basket enclosure 16 in two positions with respect to the load platform 4. In a lower position 30, the basket enclosure 16 is dropped to, or held against the floor 8 by its weight. In the second, upper position 32 the basket enclosure 16 is supported by the load platform 4 in a raised position 32, clear of the floor 8. In the lower position 30, the basket, by its own weight, provides a frictional engagement with the floor 8 for the inventive basket 2. This frictional engagement acts as a brake, preventing unwanted movement of the basket. Further, since the brake action is released only by lifting the basket enclosure 16 so as to engage the latches 26 in the upper position 32, it is far less likely to be accidentally released than other wheel brake structures. This adds safety to the braking action, especially in home environments; the invention's braking setting is essentially child proof.

In simplest form each latch 26 is formed of two overlapping protrusions or of mating protrusions and grooves, mounted on the basket enclosure 16 and the platform 4, that hold the basket enclosure 16 in one of the two positions 30, 32, with respect to the platform 4. It is of course apparent that the relative positions of the protrusions and wedges or the protrusions and grooves may be reversed, for example with a protrusion 40 mounted of the edges 22, 24 of the platform 4, and a groove 50 inwardly extending from the basket enclosure 16, such as shown in FIG. 32.

One embodiment is a protrusion 40, mounted inwardly low on the inner wall 10 of the basket enclosure 16; a matching wedge 42 on the edge 22, 24 of the load platform 4 interconnects with the protrusion 40, latching into one of two levels corresponding to the upper 32 and lower 30 basket enclosure 16 positions with respect to the basket platform 4.

In this first form of the latch, the protrusion 40 is a fixed, inwardly extending horizontally extending bend, having a lower edge 44, a middle groove 46 and an upper edge 48. The wedge 42 is flexible, and deforms as it moves from below the protrusion 40 upwardly into engagement with the groove 46, which locks the basket enclosure 16 into the upper position 32. The groove 46 holds the platform 4 against further movement with respect to the basket enclosure 16, permitting the basket 2 to be dumped without the platform 4 falling free.

An alternate form of latch 26 provides a horizontal protrusion 40 on the inner wall 10 of the basket 2 and a matching groove 50 in the platform as noted above, these protrusions and grooves may be reversed in position. At least one groove 50 should be provided corresponding to the upper position 32 of the basket enclosure 16. When the basket enclosure 16 is raised into engagement between the protrusion 40 and groove 50, the basket enclosure 16 is locked in the upper position 32; when the basket enclosure 16 is pushed down, out of engagement, it drops to the floor level as a brake. This generally works best when there is a slight inward taper to the basket enclosure 16 walls 10 towards the bottom 18 of the basket 2, and most parts containers of the basket type have such a tapered shape. Alternatively, a second groove 50 may be provided on the basket enclosure 16, to lock the basket enclosure 16 in the lower 30 position.

In a third embodiment, the latch 26 mates a facing protrusion 40 on the basket enclosure 16 with a wedge 42 on the load platform 4. Either the protrusion 40 or the wedge 42 should be sufficiently ductile to be pushed past the other, yet sufficiently stiff to resist the downward force of the weight of the basket enclosure 16. In this embodiment, the mating protrusion 40 and wedge 42 support the basket enclosure 16 above the floor level 8, and when pushed to a lower position, the basket enclosure 16 falls free to the floor level 8. In the case of this embodiment, a second means 52 of retaining the load platform 4 may be desirable, especially if the basket 2 is to be tipped to dump its contents. Such a means may include a groove 54, corresponding to the lower position 30 of the basket enclosure 16 for engaging and holding an edge 56 or a lip on the platform 4.

The latches 26 are necessarily provided in at least pairs, at opposite ends 24 of the platform 4 so as to balance the basket enclosure 16 in attachment to the platform 4. A round platform 4 may have three or more latches 26 symmetrically spaced around its platform 4. Likewise on a rectangular platform 4, additional pairs of latches 26 may be positioned along the side edges 22 of the platform 4. Such a structure provides redundant latches 26, and, as a consequence, wear and tear on the latch mechanisms causes only gradual failure; if one latch wears out or fails to engage fully, the remaining latches still support the basket enclosure.

In order to assist in moving the basket 2, and for raising or lowering basket enclosure 16, one or more handles 60 may be provided on the exterior of the basket enclosure 16. Such handles 60 may be fixed handles, molded into the sides 10 of the basket enclosure 16, or they may be pivoting handles as shown in the figures.

It can therefore be easily seen that the described invention provides a construction for a parts container of the basket type which is particularly simple in construction, uses a minimum of moving parts, and yet provides a braking action that is more reliable and less likely to be accidentally released than the prior art.

The invention has been described in multiple embodiments, and those skilled in the art can see various alternate embodiments which still fall within the scope of the invention. In particular the positions of protrusion and wedge may be reversed between platform and basket enclosure, and other two position latch engagement structures are known in the art that would support the basket enclosure in engagement with the load platform in the upper and the lower position. The described embodiments for the latches are merely believed to be particularly simple of construction, and easily incorporated in the manufacture of the invention. The invention therefore extends to the wider scope of the claims.

I claim:

1. A wheeled basket for holding contents comprising:

a load bearing platform supported by a plurality of wheels for rolling on a floor, said wheels being pivotally affixed to said platform for maintaining said platform at a fixed height relative to said floor, a basket container having an outer peripheral wall surrounding said platform, a bottom wall located below said platform, and openings formed in said bottom wall; and a plurality of latches for selectively latching said container to said platform in either of a lower position and a upper position relative to said platform, said wheels adapted to pass through said openings formed in said bottom wall when said container is in said upper position to permit rolling engagement with said floor and said bottom wall having a friction surface adapted to engage with said floor when said container is in said lower position for braking said wheeled basket.

2. The basket of claim 1, wherein said platform is circular in shape;

said platform having three wheels.

3. The basket of claim 1, each of said plurality of latches comprising:

a horizontally disposed inward protrusion on said container, engagingly facing a horizontal wedge on said platform;

a groove in said position for engaging said wedge;

said wedge being sufficiently ductile that said wedge may be displaced by a vertical force from a first position below said protrusion to a second position engaged in said protrusion groove;

said wedge being sufficiently ductile that said wedge may be displaced by a vertical force from said second position in said protrusion groove to said first position below said protrusion;

said wedge being sufficiently stiff that the weight of said container is insufficient for said displacing vertical force.

4. The basket of claim 1, each of said plurality of latches comprising:

a horizontally disposed inward protrusion on said container, engagingly facing a horizontal groove on said platform;

said protrusion being sufficiently ductile that said protrusion may be displaced by a vertical force from a first position below said protrusion to a second position engaged in said groove;

said protrusion being sufficiently ductile that said protrusion may be displaced by a vertical force from said second position engaged in said groove to said first position below said groove;

said protrusion being sufficiently stiff that the weight of said container is insufficient for said displacing vertical force.

5. The basket of claim 1, each of said plurality of latches comprising:

a horizontally disposed inward protrusion on said container, engagingly facing a horizontal outward protrusion on said platform;

at least one of said protrusions being sufficiently ductile that said inward protrusion may be displaced by a vertical force from a first position below said outward protrusion to a second position above said outward protrusion;

said protrusion being sufficiently stiff that the weight of said container is insufficient for said displacing vertical force.

6. The basket of claim 3, said platform being rectangular, having ends and sides thereof, further comprising:

a pair of said latches, one on each end thereof;

at least one pair of latches, one on each side thereof.

7. The basket of claim 4, said platform being rectangular, having ends and sides thereof, further comprising:

a pair of said latches, one on each end thereof;

at least one pair of latches, one on each side thereof.

8. The basket of claim 5, said platform being rectangular, having ends and sides thereof, further comprising:

a pair of said latches, one on each end thereof;

at least one pair of latches, one on each side thereof.

9. The basket of claim 6, further comprising at least four wheels supporting said platform.

10. The basket of claim 7, further comprising at least four wheels supporting said platform.

\* \* \* \* \*